(12) United States Patent
Awazu et al.

(10) Patent No.: US 7,577,347 B2
(45) Date of Patent: Aug. 18, 2009

(54) IMAGE TAKING APPARATUS

(75) Inventors: Kouhei Awazu, Asaka (JP); Kentaro Tokiwa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 580 days.

(21) Appl. No.: 11/486,143

(22) Filed: Jul. 14, 2006

(65) Prior Publication Data

US 2007/0014558 A1 Jan. 18, 2007

(30) Foreign Application Priority Data

Jul. 14, 2005 (JP) ............................. 2005-205772
May 26, 2006 (JP) ............................. 2006-146757

(51) Int. Cl.
*G03B 15/05* (2006.01)
(52) U.S. Cl. .......................... 396/62; 396/175; 396/200
(58) Field of Classification Search .................. 396/62, 396/175, 177, 178, 200; 362/16–18
See application file for complete search history.

(56) References Cited

U.S. PATENT DOCUMENTS 5,734,934 A * 3/1998 Horinishi et al. .............. 396/62
6,011,929 A * 1/2000 Fuke et al. ................... 396/175

FOREIGN PATENT DOCUMENTS

| JP | 55-129326 | 10/1980 |
|----|-----------|---------|
| JP | 02-291538 | 12/1990 |
| JP | 06-180469 | 6/1994 |
| JP | 2001-005072 | 1/2001 |

* cited by examiner

*Primary Examiner*—William B Perkey
(74) *Attorney, Agent, or Firm*—Sughrue Mion, PLLC

(57) ABSTRACT

In an image taking apparatus, an arc tube and a reflector are moved forward when a zoom switch is operated to a WIDE-side and two reflection side plates are disposed such as to cover and hide Fresnel lenses located on both ends of a protector. Light emitted sideway from the arc tube is reflected from the reflection side plates, the light is introduced toward a central portion of the protector, and a radiation field suitable for a wide angle is formed. If the zoom switch is operated toward the TELE side, the reflection side plates are inclined such as to expose the Fresnel lenses on the both ends of the protector and the arc tube and the reflector are retreated at the same time, light emitted sideway from the arc tube is entirely guided to the Fresnel lenses, and a radiation field suitable for a TELE angle is formed.

4 Claims, 9 Drawing Sheets

(a)

(b)

IMAGE TAKING APPARATUS

BACKGROUND OF THE INVENTION

1. Field of the Invention

The present invention relates to an image taking apparatus which includes an image pickup device and which forms a subject image on the image pickup device and produces image signals.

2. Description of the Related Art

Many image taking apparatuses include light-emitting sections which emit flash toward a subject in synchronization with image taking action. In such an image taking apparatus, when a radiation field of flash emitted from the light-emitting section is set to a short focus point (wide-angle), much light is emitted out of image taking angle of view corresponding to a telephoto angle in response to a zoom switch being operated to a long focus point (telephoto) and therefore, electric power is consumed in vain. Accordingly, many image taking apparatuses employ a technique in which the radiation field of flash can be changed in association with operation of the zoom switch (see Japanese Patent Application Laid-open (JP-A) No. 55-129326 for example). According to JP-A 55-129326, at least one of the arc tube and the reflector is moved forward and rearward in the optical axial direction in accordance with operation of the zoom switch, thereby obtaining a radiation field suitable for the image taking angle of view in accordance with the operation position of the zoom switch.

However, there still remains a problem that if the arc tube is of rod-like shape like the xenon tube, excessive light is emitted sideway of the arc tube, and electric power is consumed in vain correspondingly.

As described in a Japanese Patent Application Laid-open No. 2-291538, there is a technique in which side reflection means is provided adjacent to the rod-like arc tube, light emitted in vain is emitted into the image taking angle of view so that the electricity efficiency is enhanced, and the suitable radiation field is obtained.

There are also a technique in which to enhance the electricity efficiency in light emission of flash, the Fresnel lens disposed in front of the arc tube is moved forward or rearward, thereby obtaining a suitable radiation field (see Japanese Patent No. 3262779), and a technique in which a shape of the reflection plate disposed behind the arc tube is deformed to obtain a suitable radiation field (see Japanese Patent Application Laid-open No. 6-180469).

In any of the techniques disclosed in the patent documents 1 to 4, however, there is a problem that the precision is not sufficient.

SUMMARY OF THE INVENTION

The present invention has been made in view of the above circumstances and provides an image taking apparatus having a light-emitting section capable of precisely adjusting a radiation field.

The present invention provides an image taking apparatus which includes an image taking lens capable of varying a focal length and which takes an image by capturing a subject by the image taking lens, the image taking apparatus includes:

a light-emitting section which emits flash toward a subject in synchronization with an image-taking operation, wherein the light-emitting section comprises:

a rod-like arc tube, a reflector which surrounds a rear portion of the arc tube in a circumferential direction and which forwardly reflects flash emitted rearward from the arc tube, two reflection side plates which are disposed on both sides of the reflector and which reflect flash from the arc tube, a protector which is provided, at locations thereof corresponding to both ends of the arc tube, with Fresnel lenses for inwardly condensing transmission flash, and which covers a front surface of the arc tube and through which flash from the arc tube transmits toward the subject, and a radiation field adjuster which moves the arc tube and the reflector in a longitudinal direction relative to the protector in accordance with a focal length of the image taking lens and at the same time, which adjusts inclinations of the two reflection side plates.

In the image taking apparatus of the present invention, the distance among the reflector, the arc tube and the protector is adjusted by the radiation field adjuster in accordance with the focal length of the image taking lens, and the inclinations of the two reflection side plates are adjusted at the same time.

With this configuration, the inclinations of the two reflection side plates are adjusted into the direction perpendicular to the protector, the distance among the reflector, the arc tube and the protector is shortened so that flash does not enter the Fresnel lens, the field is precisely adjusted to a radiation field suitable for short focus point (wide angle). Also, the inclinations of the two reflection side plates are adjusted into the direction parallel to the protector and at the same time, the distance among the reflector, the arc tube and the protector is increased so that flash enters the Fresnel lens, the incident angle of flash entering the Fresnel lens is varied so that the field can be precisely adjusted to a radiation field suitable for long focus point (telephoto).

In the image taking apparatus having the image taking optical system capable of varying the focal length, the image taking optical system of variable focal length is incorporated in the lens barrel in many cases, the lens barrel is moved forward and rearward in accordance with operation of the zoom switch, thereby moving a lens which can vary the focal length forward and rearward in the optical axial direction, and the focal length is precisely adjusted in many cases. By utilizing the fact that the lens barrel is precisely moved forward and rearward in accordance with the operation of the zoom switch, the arc tube and the reflector can be moved forward and rearward. This can easily be carried out if a connection mechanism is provided between the lens barrel, the arc tube and the reflector. If the two reflection side plates are turned, the inclinations of the two reflection side plates can relatively easily adjusted by providing a cam mechanism between the lens barrel and the two reflecting side plates.

As explained above, an image taking apparatus having a light-emitting section capable of easily adjusting the radiation field is realized with a simple structure.

It is preferable that as a focal length of the image taking lens is closer to a long focus side, the radiation field adjuster rearwardly moves the arc tube and the reflector away from the protector, and adjusts inclinations of the two reflection side plates into a direction parallel to the protector.

With this preferable configuration, when a radiation field suitable for a longer focal length is to be obtained, the reflector and the arc tube may be rearwardly moved away from the protector.

In other words, with this configuration, when a long focal length is not required, a distance through which the reflector and the arc tube are rearwardly moved away from the protector can be shortened. Therefore, the light-emitting section can be reduced in thickness.

A zoom magnification to some degree can be covered only by adjusting the inclinations of the reflection side plates depending upon the position of the Fresnel lens or the setting of index of refraction in some cases. With this, in addition to the inclination of the reflection side plate, a higher zoom magnification can be realized by rearwardly moving the reflector and the arc tube with respect to the protector.

As described above, in the preferable configuration, as the focal length of the image taking lens is closer to the long focus side, the radiation field adjuster rearwardly moves the reflector and the arc tube away from the protector and adjusts the inclinations of the two reflection side plates into a direction in which the two reflection side plates are in parallel to the protector. With this configuration, as the two reflection side plates are inclined, and as the reflector and the arc tube are rearwardly moved away from the protector, a distance between the tip ends of the two reflection side plates and the protector is increased.

This configuration eliminates an adverse possibility that when the radiation field is adjusted by the radiation field adjuster, light leaks from the gap and light emitted from the arc tube is not effectively utilized.

Hence, it is preferable that the protector has the Fresnel lens formed along a locus formed by a tip end of each of the two reflection side plates when the radiation field adjuster rearwardly moves the arc tube and the reflector away from the protector and adjusts inclinations of the two reflection side plates into a direction in which the two reflection side plates are in more parallel to the protector.

With this configuration, wherever the two reflection side plates are located, light emitted from the arc tube is collected by the Fresnel lens, almost all light emitted from the arc tube is emitted toward a subject, and the light emitting efficiency is enhanced. Further, a thickness of a portion which forms the Fresnel lens can be increased, and there is an effect that the notch of the Fresnel lens can easily be formed by molding.

The image taking apparatus may further includes reflection plates which reflect light emitted sideway beyond the reflection side plates toward the protector.

With this, light passing through the gap and moving sideway is reflected by the reflection plates and guided toward the protector. Thus, almost all light emitted from the arc tube is emitted toward the subject and the light emitting efficiency is enhanced.

As explained above, an image taking apparatus having a light-emitting section capable of precisely adjusting the radiation field is realized.

DETAILED DESCRIPTION OF THE INVENTION

An embodiment of the invention will be explained below.

Figure 1:
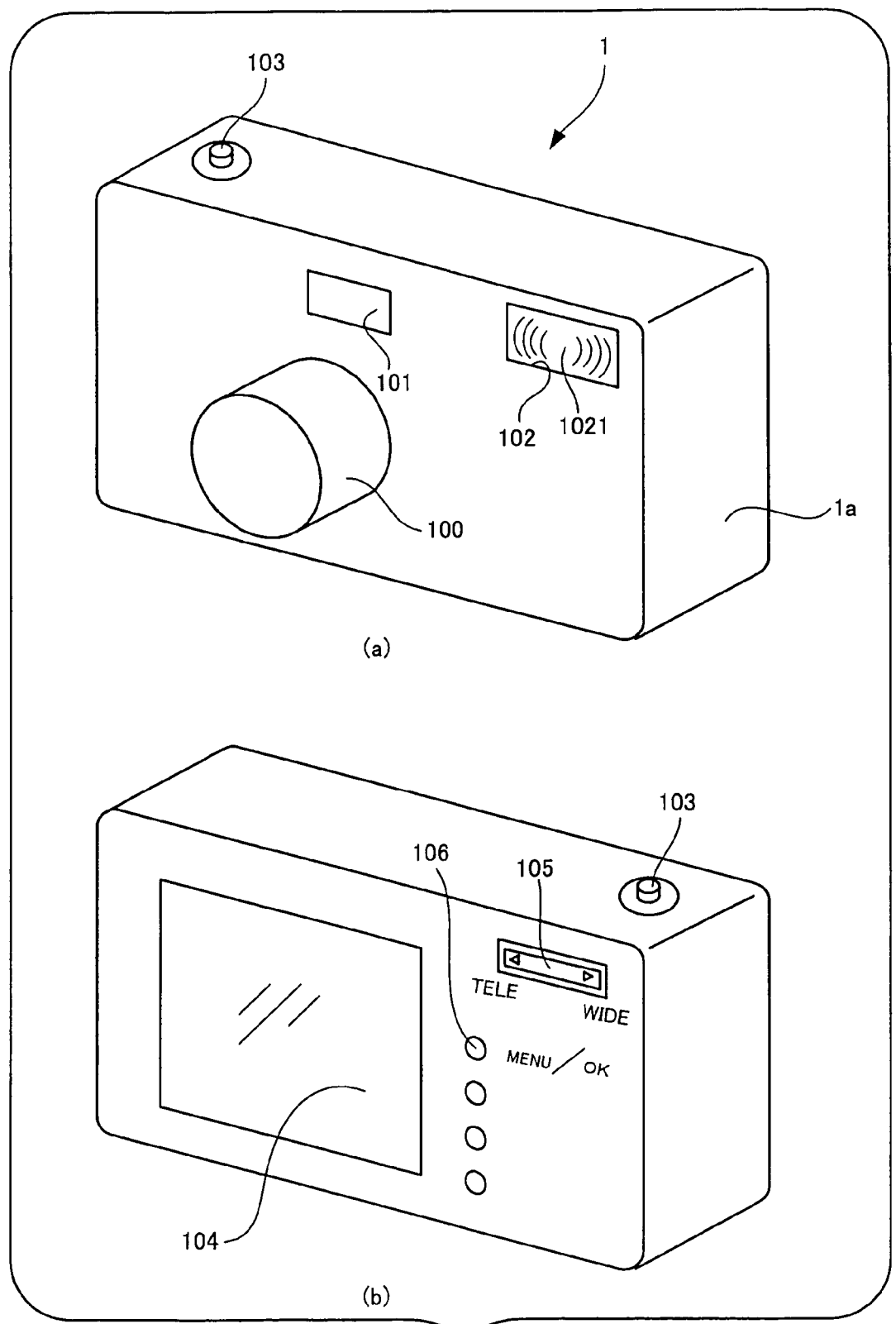
FIG. 1 is a diagram showing an outward appearance of a digital camera according to an embodiment of an image taking apparatus of the present invention.

FIG. 1 shows an outward appearance of a digital camera 1 according to an embodiment of an image taking apparatus of the present invention.

Part (a) of FIG. 1 shows a perspective view of a front surface of the digital camera 1 as viewed from a front diagonally upper side, and part (b) of FIG. 1 shows a perspective view of a back surface of the digital camera 1 as viewed from a rear diagonally upper side.

The digital camera 1 shown in parts (a) and (b) of FIG. 1 includes an image taking lens capable of varying a focal length. The image taking lens captures subject light, thereby taking an image.

As shown in part (a) of FIG. 1, a camera body 1a is provided at its front surface central portion with a lens barrel 100 which can telescopically extend and retract. An image taking lens capable of varying the focal length is incorporated in the lens barrel 100. FIG. 1 shows a state after a power supply switch is turned ON, preparations for an image taking operation are made, and the lens barrel is extended.

A finder 101 is provided above the lens barrel 100. A flash light-emission window 102 is provided adjacent to the finder 101. A protector 1021 having Fresnel lenses formed at both ends thereof is fit into the light-emission window 102 in the longitudinal direction. Flash is emitted from a light-emitting section in the flash light-emission window 102 toward a subject in synchronization with the image taking operation by a release button 103.

A display panel 104 is provided on a back surface of the camera body 1a shown in part (b) of FIG. 1. An image of a subject captured by the image taking lens 100 is continuously displayed on the display panel 104. A zoom switch 105, a menu switch 106 and the like are provided adjacent to the display panel 104. A zooming operation from telephoto (TELE) to wide angle (WIDE) is carried out in accordance with operation of the zoom switch 105.

A light-emitting section is disposed in the digital camera 1. The light-emitting section can freely adjust the radiation field such that flash can be emitted from the light-emission window 102 toward the image taking angle of view in accordance with operation of the zoom switch 104.

Figure 2:
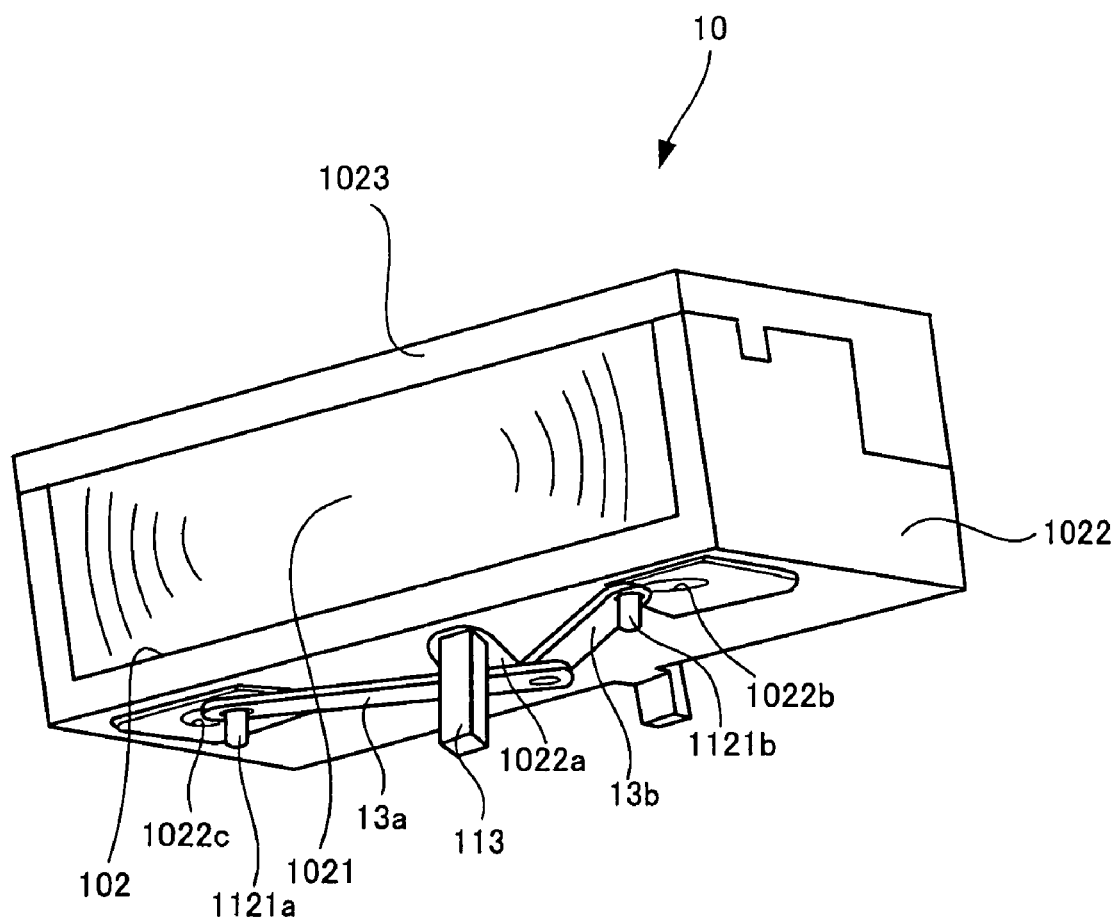
FIG. 2 is a diagram an outward appearance of an accommodation case in which a light-emitting section is accommodated.

FIG. 2 shows an outer appearance of an accommodation case 10 in which the light-emitting section is accommodated.

A through hole 1022a is formed in a lower surface of the accommodation case 10 shown in FIG. 2. When a surface on which the protector 1021 is disposed is defined as a front side, the through hole 1022a has a predetermined length from a front portion toward a rear portion. An engaging member 113 is engaged in the through hole 1022a. The engaging member 113 extends from a folder (later-described) in the accommodation case 10. If the engaging member 113 is connected to a connecting member (not shown) which moves in association with motion of the lens barrel 100 of the camera body 1a, the folder in the accommodation case 10 moves forward and rearward in accordance with motion of the lens barrel 100.

Structures of the accommodation case 10 and members disposed outside the accommodation case 10 will be explained with reference to FIG. 2.

The accommodation case 10 shown in FIG. 2 includes the protector 1021 shown in FIG. 1 also, a base section 1022 and a lid section 1023. A window 102 is formed by mounting the lid section 1023 on the base section 1022. If the protector 1021 is fitted to the window 102, the accommodation case 10 having the outer appearance shown in FIG. 2 is obtained.

Two through holes 1022b and 1022c are formed in a lower surface of the accommodation case 10 symmetrically with respect to the through hole 1022a. The through holes 1022b and 1022c are formed such that space therebetween is broadened toward one end. The through holes 1022b and 1022c are diagonally notched toward a rear side wall of the accommodation case 10 such that inclination of two reflection side plates can be adjusted while defining a side of the protector 1021 as a front surface. Engaging members 1121a and 1121b extending downward from one ends of the two reflection side plates (later-described) are engaged in the through holes 1022b and 1022c. The engaging members 1121a and 1121b are connected through link members 13a and 13b so that they can move in association with motion of the engaging member 113. Here, one ends of the two link members 13a and 13b are turnably supported by a rear lower surface of the accommodation case 10, and the other ends are engaged with tip ends of the engaging members 1121a and 1121b. The other ends of the two reflection side plates are turnably supported by a spindle in the accommodation case 10. This state will be described later. The engaging members 1121a and 1121b are turned such that they are guided in the shape of the through holes 1022b and 1022c if the lens barrel moves forward and rearward. When the engaging members 1121a and 1121b are turned in this manner, occurrence of a difference between motions of both the engaging members 1121a and 1121b is not desired. Therefore, tip ends of both the engaging members 112a and 112b are connected to each other through the link members 13a and 13b.

With this configuration, the later-described folder in the accommodation case 10 moves forward and rearward in the optical axial direction in accordance with motion of the lens barrel 100 and the inclinations of the two reflection side plates are adjusted at the same time.

Here, the accommodation case 10 shown in FIG. 2 is decomposed, constituent members in the accommodation case 10 are taken out, and a configuration of the light-emitting section will be explained in detail.

Figure 3:
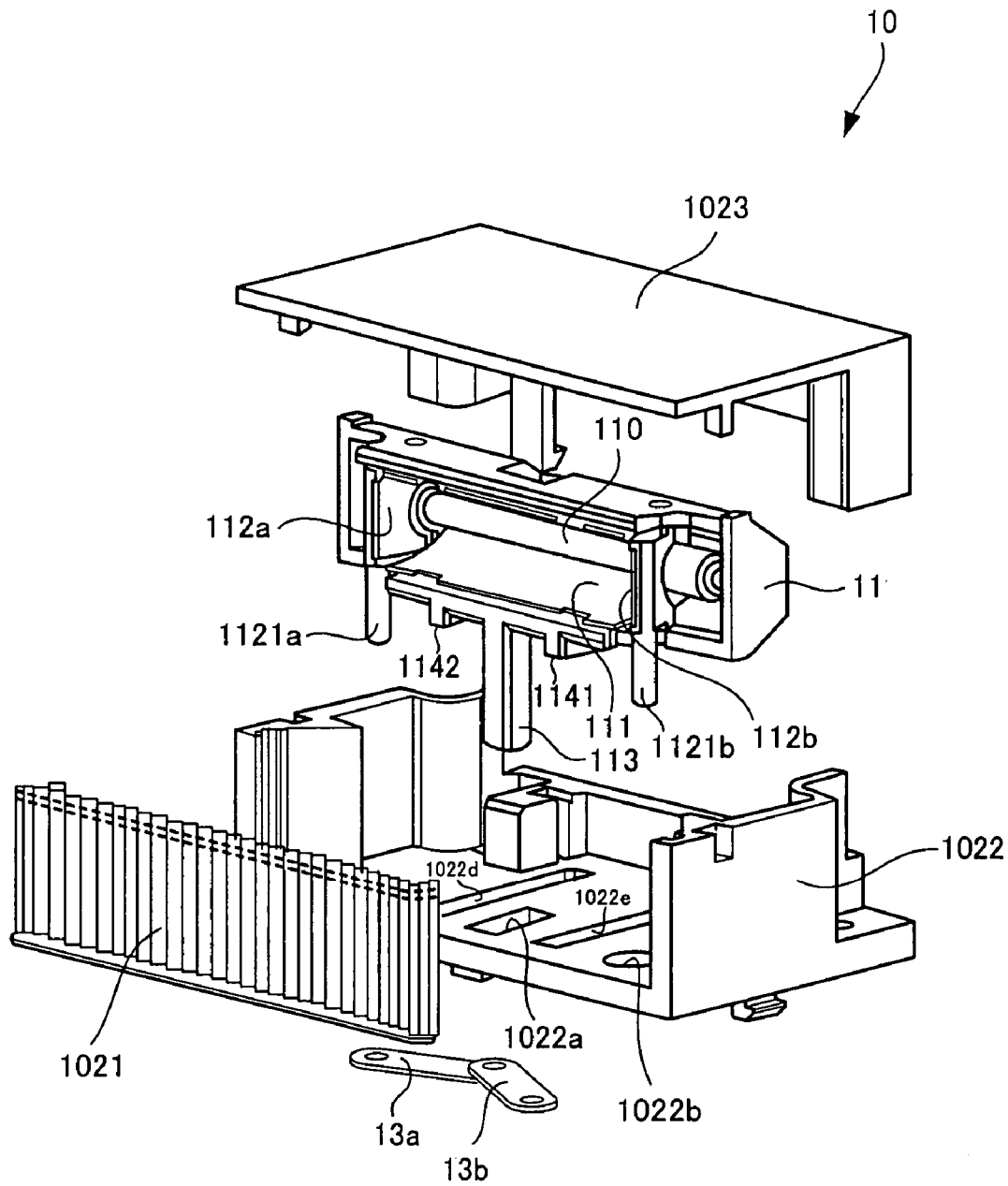
FIG. 3 is an exploded view used for explaining a configuration of the light-emitting section in the accommodation case shown in FIG. 2.

FIG. 3 is an exploded view used for explaining a structure of the light-emitting section in the accommodation case 10 shown in FIG. 2.

The folder 11 is shown at a central portion of FIG. 3. The folder 11 is provided at its side opposed to the protector 1021 with an opening. Flash is emitted through the opening toward the protector 1021. The opening side is defined as a front side. The rod-like arc tube 110 and the reflector 111 which surrounds a rear portion of the arc tube 110 in the circumferential direction and which forwardly reflects flash emitted from the arc tube 110 rearward are accommodated in deep side in the folder 11. Two reflection side plates 112a and 112b are disposed on both sides of the reflector 111 and reflect flash from the arc tube 110. The reflection side plates 112a and 112b are disposed such as to project forward from the opening of the folder 11. Deep side ends of the two reflection side plates 112a and 112b are turnably supported by spindles in the folder 11. Therefore, the ends disposed such as to project from the opening can turn abound the spindles. The engaging members 1121a and 1121b shown also in FIG. 2 are engaged with the turnable ends, and tip ends of the engaged egaging members are engaged in the through holes 1022c and 1022b (see FIG. 2). Tip ends of both the engaging members 1121a and 1121b are connected to each other on the side of the lower surface of the accommodation case through the link members 13a and 13b so that the engaging members 1121a and 1121b engaged in the through holes 1022b and 1022c (see FIG. 2) moves in association with forward and rearward motion of the lens barrel. With this, the accommodation case having the outward appearance shown in FIG. 2 is obtained.

Therefore, if the engaging member 113 projecting from the lower surface of the accommodation case 10 shown in FIG. 2 is connected to a connecting member extending from the lens barrel, the folder 11 moves forward and rearward in accordance with the forward and rearward motion of the lens barrel, the folder 11 moves forward and rearward and the inclinations of the two reflection side plates 112a and 112b are precisely adjusted at the same time.

That is, in the embodiment, the following members correspond to an example of the radiation field adjuster of the present invention, i.e., the lens barrel 100, the folder 11, the engaging member 113 which connects the folder and the lens barrel, the through hole 1022a in which the engaging member 113 is engaged, the engaging members 1121a and 1121b provided on the tip ends of the reflection side plates 112a and 112b, the through holes 1022b and 1022c in which the engaging members are engaged, the spindles which turnably supports the other ends of the reflection side plates 112a and 112b, and the link members 13a and 13b.

FIG. 3 shows an example in which the folder 11 is provided with two guides 1141 and 1142 so that the folder 11 can stably move forward and rearward, and guide grooves in which the two guides 1141 and 1142 are engaged are formed in the base section 1022. If the guides 1141 and 1142 of the folder 11 are engaged in these two guide grooves 1022d and 1022e, the folder 11 moves forward and rearward while maintaining its stable attitude.

Here, the operation will be explained.

Figure 4:
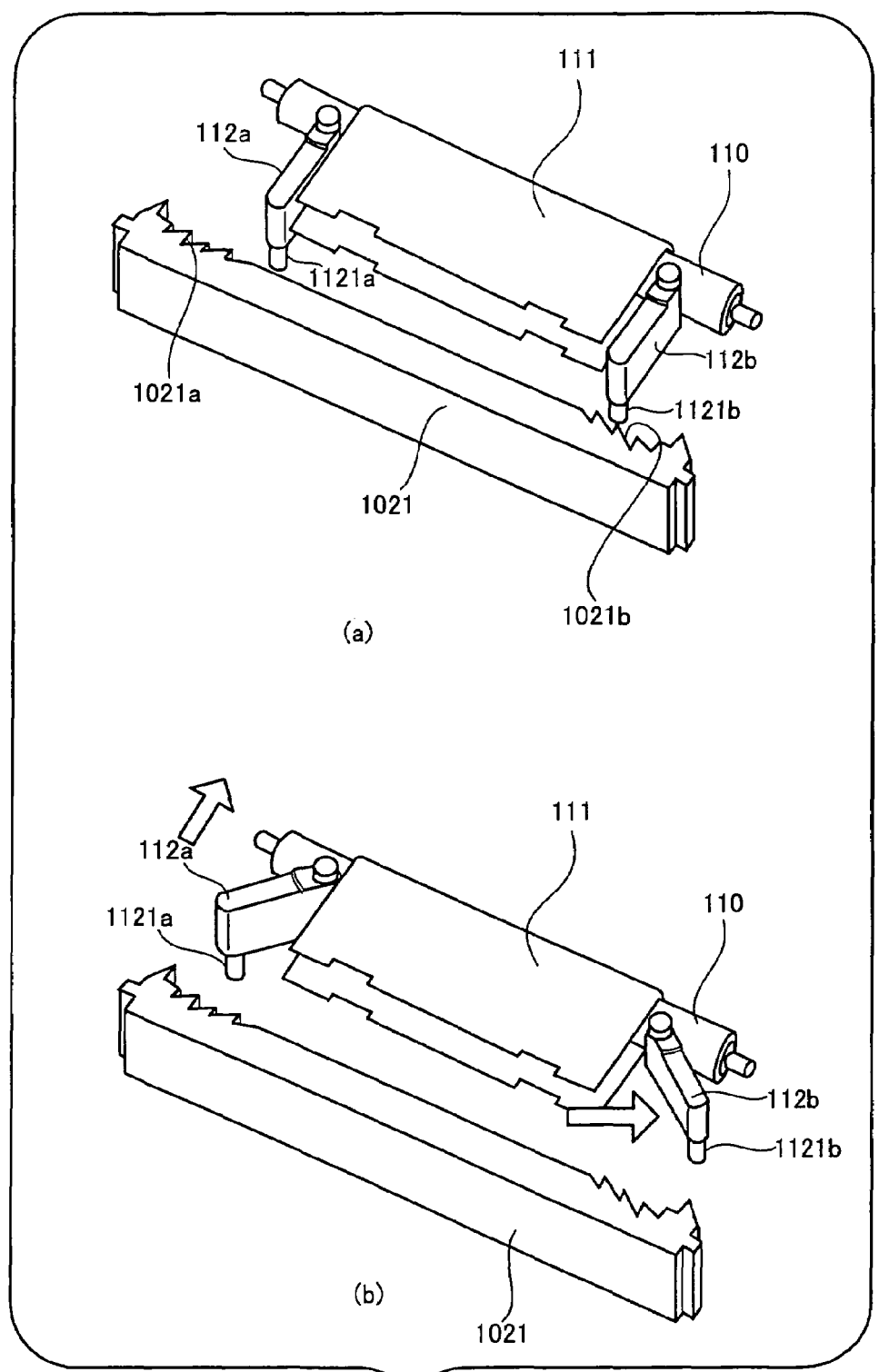
FIG. 4 is a diagram showing a positional relation between a folder and a protector.
Figure 5:
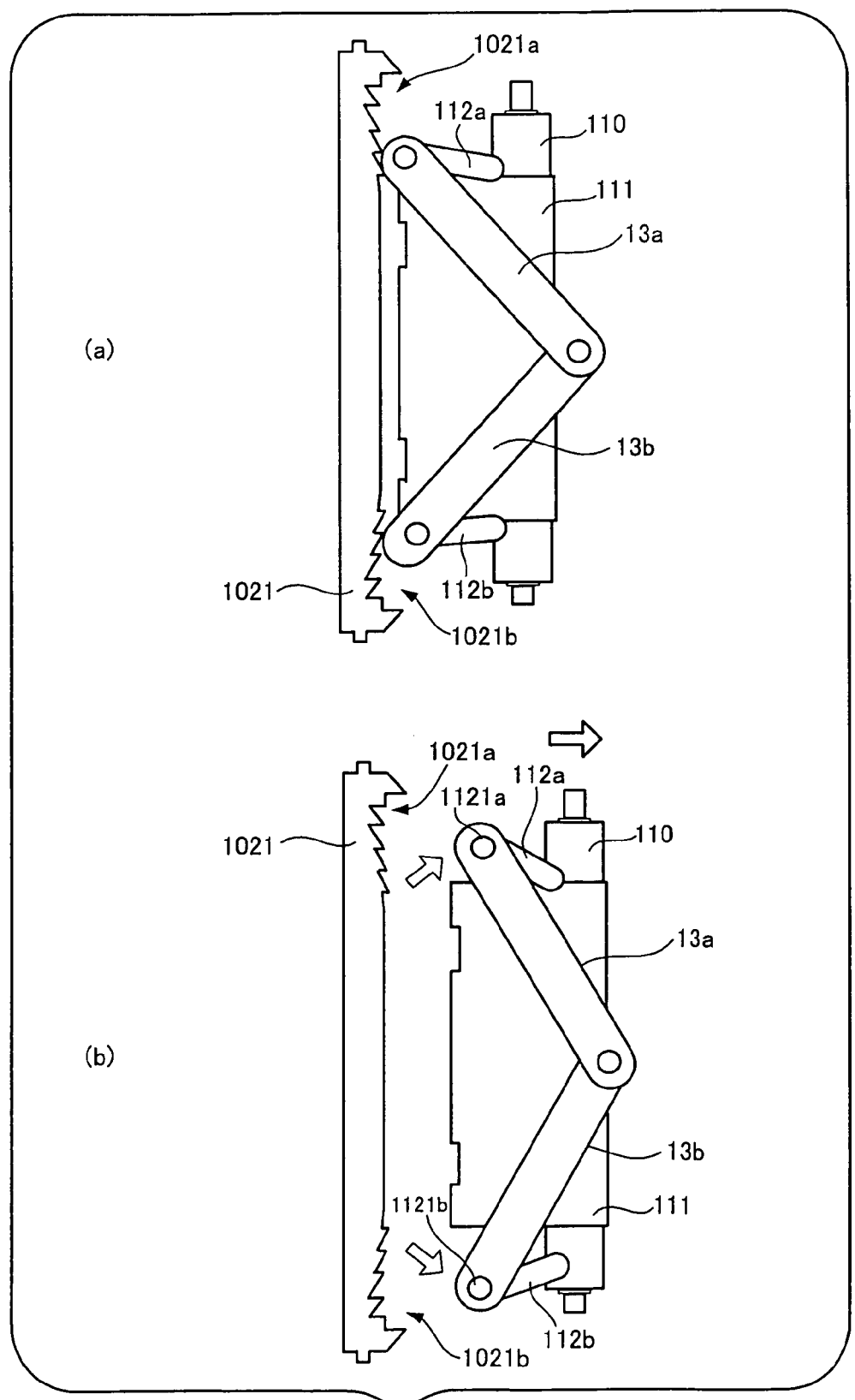
FIG. 5 is a diagram of the state shown in parts (a) and (b) of FIG. 4 as viewed from below.

FIG. 4 is a diagram used for explaining a position relation between the arc tube 110 accommodated in the folder, the reflector 111 provided such as to surround the arc tube 110, the protector 1021 disposed such as to cover front surfaces of the arc tube 110 and the reflector 111, and the reflection side plates 112a and 112b. FIG. 5 is a diagram of the state shown in FIG. 4 as viewed from below.

Part (a) of FIG. 4 and part (a) of FIG. 5 show a position relation between the arc tube 110, the reflector 111, the protector 1021 and the reflection side plates 112a and 112b when the zoom switch is operated to the end of the WIDE side, i.e., to the end of a short focus side. Part (b) of FIG. 4 and part (b) of FIG. 5 show how the positional relation of the arc tube 110, the reflector 111, the protector 1021 and the reflection side plates 112a and 112b are varied when the zoom switch is operated to the TELE side, i.e., a long focus side with respect to the states shown in part (a) of FIG. 4 and part (a) of FIG. 5.

As shown in part (a) of FIG. 4 and part (a) of FIG. 5, when the zoom switch is on the WIDE side, in order to prevent light from the arc tube 110 and the reflector 111 from entering the fresnel lenses 1021a and 1021b, the two reflection side plates 1121a and 1121b are disposed at positions to cover and hide the Fresnel lenses 1021a and 1021b located at both ends of the protector 1021. In this state, if the zoom switch is operated to the TELE side, as shown in part (b) of FIG. 4 and part (b) of FIG. 5, the arc tube 110 and the reflector 111 retreat away from the protector 1021, and the inclinations of the reflection side plates 112a and 112b are adjusted at the same time.

With this configuration, the inclinations of the two reflection side plates 112a and 112b are adjusted into the direction perpendicular to the protector, the arc tube 110 and the reflector 111 are brought close to the protector 1021 so that flash does not enter the Fresnel lenses 1021a and 1021b. With this, it is possible to precisely adjust the radiation field in a suitable manner to the short focus point (wide angle), to adjust the inclinations of the two reflection side plates into the direction parallel to the protector, and if the reflector 111 and the arc tube 110 are moved away from the protector 1021 so that flash enters the Fresnel lenses 1021a and 1021b, and if the incident angle of flash entering the Fresnel lenses 1021a and 1021b is changed, it is possible to precisely adjust the radiation field suitably for the long focus point (telephoto).

In this embodiment, the function for moving the lens barrel forward and rearward has high precision is utilized, which is reflected to the adjustment precision of inclinations of the reflection side plates of the lens barrel and therefore, high precision adjustment of the radiation field is realized.

That is, an image taking apparatus having a light-emitting section capable of precisely adjusting the radiation field is realized.

When the two reflection side plates 112a and 1102b are adjusted into the direction parallel to the protector 1021 and the arc tube 110 and the reflector 111 are moved away from the protector 1021, a gap between the tip ends of the two reflection side plates 112a and 112b and the protector 1021 is increased. If the gap is increased, light emitted sideway from the arc tube 110 leaks from the gap, light is not collected toward the protector, a loss is generated in the light emitting amount which should be emitted to toward a subject, and light emitting efficiency is deteriorated. If the light emitting efficiency is deteriorated, a reaching distance is shortened. Hence, it is desired to prevent light from leaking from the gap.

Figure 6:
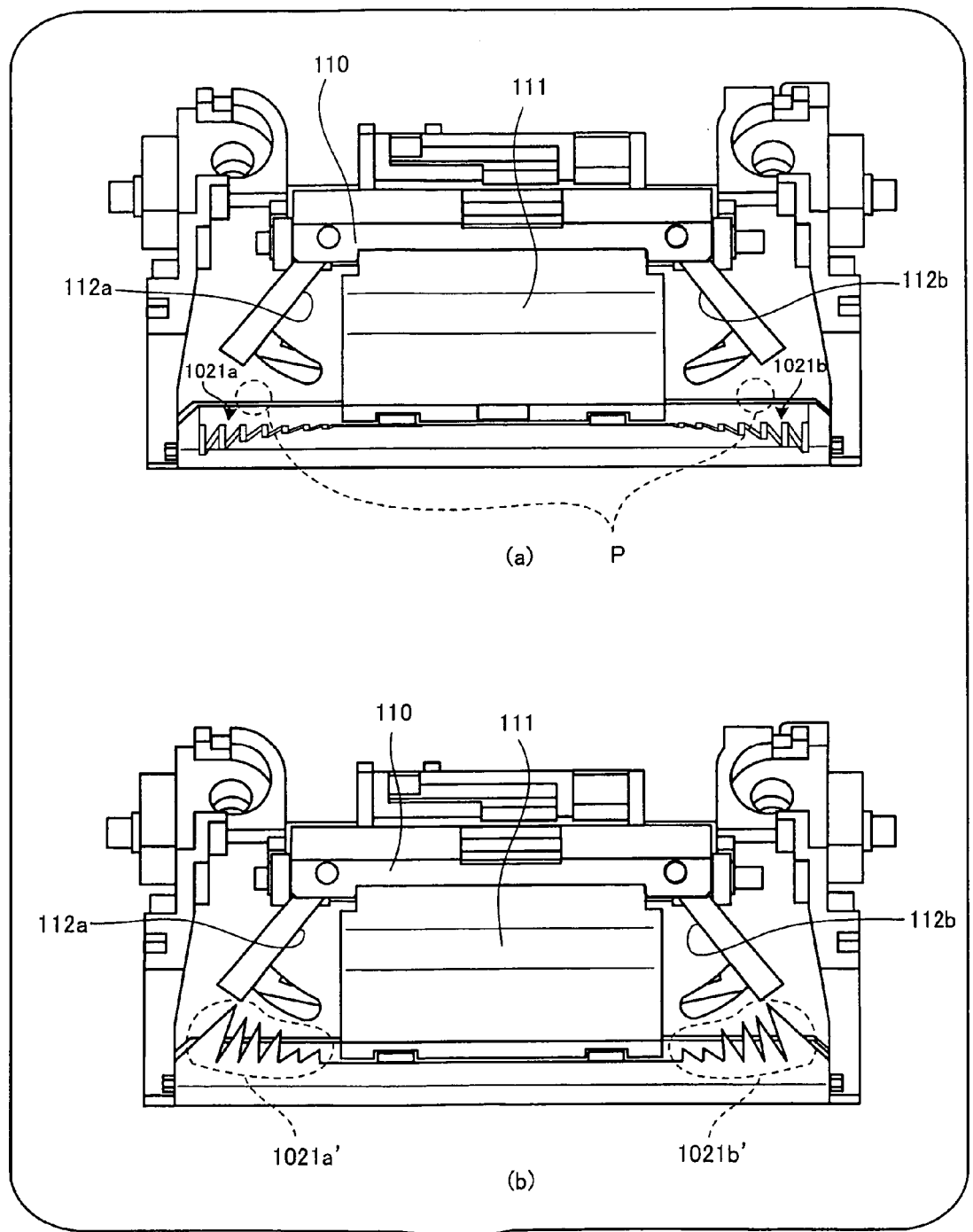
FIG. 6 is a diagram showing one example of a structure for preventing an increase of a loss of a light emitting amount caused by leakage of light from a gap between a protector and tip ends of two reflection side plates.

FIG. 6 shows one example of such a structure.

Part (a) of FIG. 6 shows a state, as viewed from above, in which the the two reflection side plates are fully adjusted into the direction parallel to the protector 1021 before the structure is improved such as to prevent light from leaking from each gap P. Part (b) of FIG. 6 shows a state, as viewed from above, in which the two reflection side plates 112a and 112b are fully adjusted into the direction parallel to the protector 1021 after the structure is improved such as to prevent light from leaking from a gap P shown in part (a) of FIG. 6.

As shown in part (a) of FIG. 6, if the two reflection side plates 112a and 112b are fully adjusted into the parallel direction, the gap P is increased in size. This gap P is increased as the two reflection side plates 112a and 112b are adjusted into the direction parallel to the protector 1021, and the gap becomes maximum at the position shown in part (a) of FIG. 6. As shown in part (b) of FIG. 6, the gap P is bridged so that the light is prevented from leaking and the light is positively utilized by forming the Fresnel lenses 1021a' and 1021b' along a locus formed by tip ends of the two reflection side plates 112a and 112b, respectively, when the inclinations of the two reflection side plates 112a and 112b into the direction parallel to the protector 1021 are adjusted.

If the structure shown in part (b) of FIG. 6 is employed, wherever the two reflection side plates 112a and 112b are located, almost all light emitted from the arc tube 110 is introduced toward the subject by the Fresnel lenses 1021a and 1021b, light emitted from the arc tube 110 is entirely used as flash without loss and thus, the light emitting efficiency is enhanced, and image taking auxiliary light can reach further. If the thickness of the end of the protector 1021, i.e., a portion thereof which forms the Fresnel lens is thick as shown in part (b) of FIG. 6, there is an effect that the notches of the Fresnel lenses 1021a' and 1021b' can easily be formed by molding.

Figure 7:
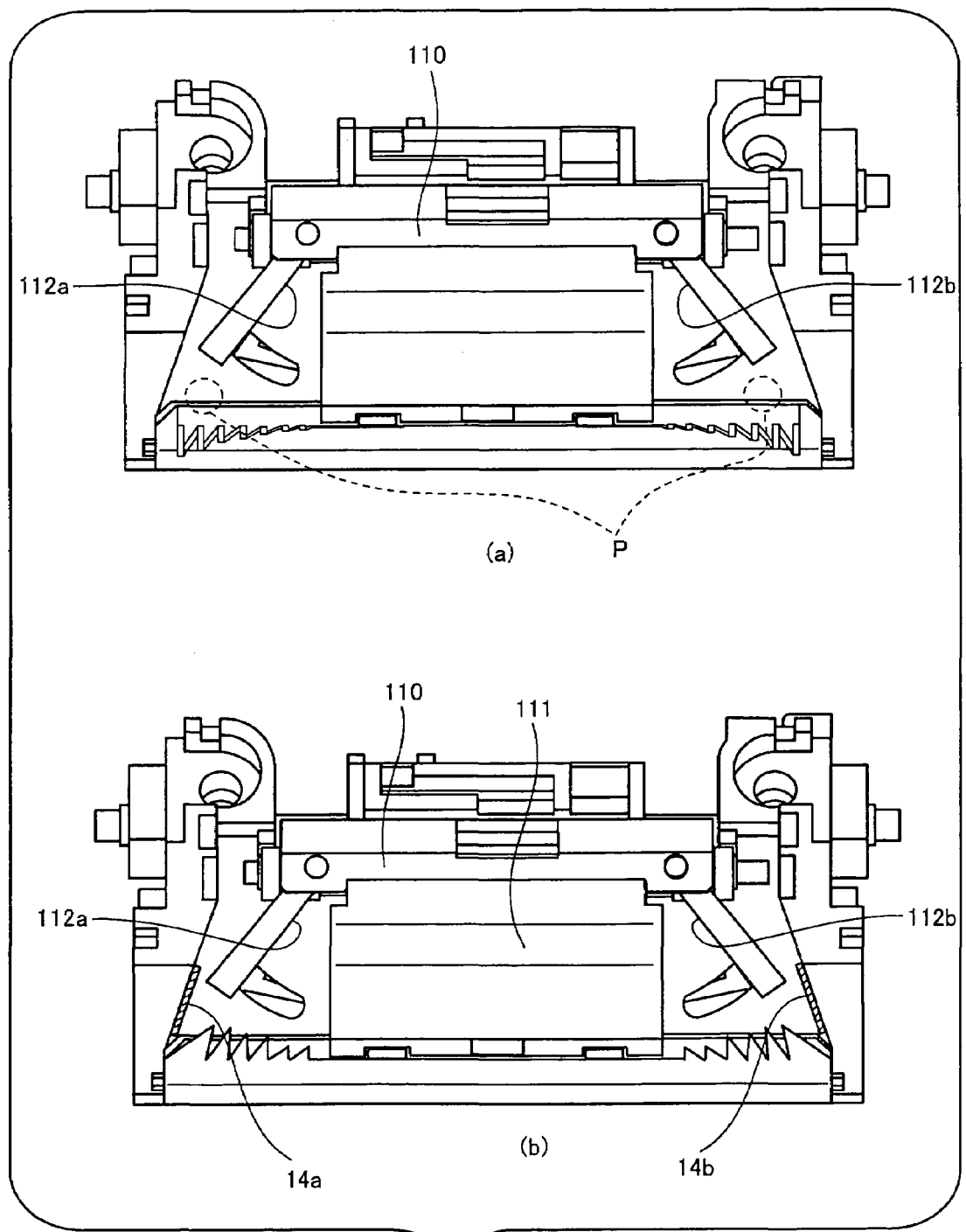
FIG. 7 is a diagram showing another example of a structure for preventing an increase of a loss of a light emitting amount caused by leakage of light from a gap between a protector and tip ends of two reflection side plates.

FIG. 7 is a diagram used for explaining another example of a structure in which light is prevented from leaking, and the light is positively utilized.

Part (a) of FIG. 7 shows the same diagram as that of part (a) of FIG. 6. In part (b) of FIG. 7, instead of modifying the shape of the Fresnel lens as shown in part (b) of FIG. 6, reflection plates 14a and 14b which reflect light emitted sideway toward the protector 1021 are provided.

With this structure also, light emitted sideway is reflected from the reflection plates 14a and 14b and is introduced toward the protector 1021. Thus, there is an effect that the light emitting efficiency is enhanced.

Figure 8:
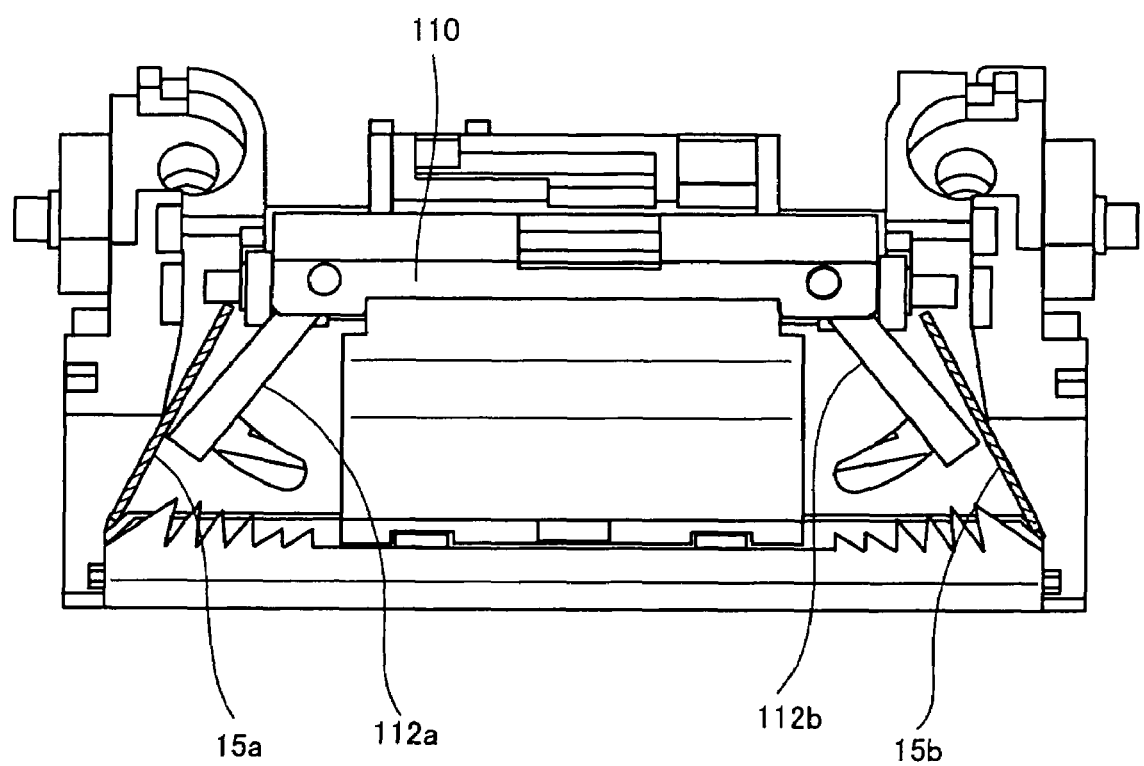
FIG. 8 is a diagram showing another modification of the structure shown in FIG. 7.
Figure 9:
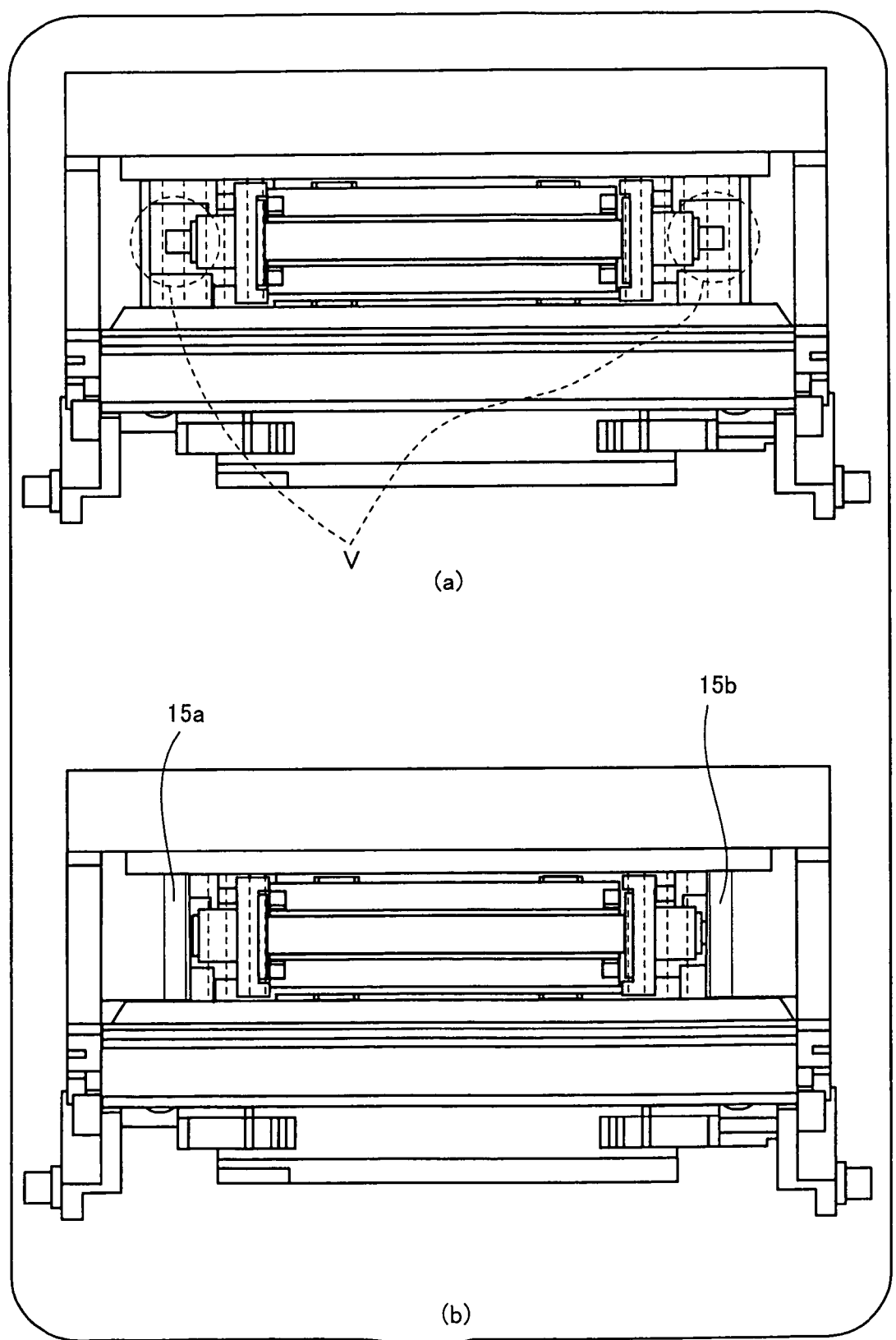
FIG. 9 is a diagram used for explaining the function when the structure shown in FIG. 8 is employed.

FIGS. 8 and 9 are diagrams used for explaining modifications in which the reflection plates are increased in length and they are used also as blinds.

As shown in FIG. 8, if reflection plates 15a and 15b are extended to an end of the arc tube 110, ends V of the arc tube 110 which are seen from a front surface through the Fresnel lens cannot be seen as shown in part (a) of FIG. 9 because the reflection plates 15a and 15b each function as a blind, and the outer appearance is improved as shown in part (b) of FIG. 9.

What is claimed is:

1. An image taking apparatus which includes an image taking lens capable of varying a focal length and which takes an image by capturing subject light by the image taking lens, the image taking apparatus comprising:
    a light-emitting section which emits flash toward a subject in synchronization with an image-taking operation,
    wherein the light-emitting section comprises:
    a rod-like arc tube,
    a reflector which surrounds a rear portion of the arc tube in a circumferential direction and which forwardly reflects flash emitted rearward from the arc tube,
    two reflection side plates which are disposed on both sides of the reflector and which reflect flash from the arc tube,
    a protector which is provided, at locations thereof corresponding to both ends of the arc tube, with Fresnel lenses for inwardly condensing transmission flash, and which covers a front surface of the arc tube and through which flash from the arc tube transmits toward the subject, and
    a radiation field adjuster which moves the arc tube and the reflector in a longitudinal direction relative to the protector in accordance with a focal length of the image taking lens and at the same time, which adjusts inclinations of the two reflection side plates.

2. The image taking apparatus according to claim 1, wherein as a focal length of the image taking lens is closer to a long focus side, the radiation field adjuster rearwardly moves the arc tube and the reflector away from the protector and adjusts inclinations of the two reflection side plates into a direction parallel to the protector.

3. The image taking apparatus according to claim 2, wherein the protector has the Fresnel lens formed along a locus formed by a tip end of each of the two reflection side plates when the radiation field adjuster rearwardly moves the arc tube and the reflector away from the protector and adjusts inclinations of the two reflection side plates into a direction in which the two reflection side plates are in more parallel to the protector.

4. The image taking apparatus according to claim 2, further comprising reflection plates which reflect light emitted sideway beyond the reflection side plates toward the protector.

* * * * *